United States Patent
Shimo

(10) Patent No.: US 6,304,388 B1
(45) Date of Patent: Oct. 16, 2001

(54) ZOOM LENS SYSTEM

(75) Inventor: Mituaki Shimo, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/580,630

(22) Filed: May 30, 2000

(30) Foreign Application Priority Data

Jun. 1, 1999 (JP) .................................................. 11-153569

(51) Int. Cl.[7] .................................................. G02B 15/14
(52) U.S. Cl. .......................................... 359/687; 359/679
(58) Field of Search .................... 359/687, 679, 359/683, 676

(56) References Cited

U.S. PATENT DOCUMENTS

| | | | |
|---|---|---|---|
| 5,062,695 | 11/1991 | Iwasaki | 359/689 |
| 5,101,299 | 3/1992 | Iwasaki | 359/676 |
| 5,138,493 | 8/1992 | Iwasaki | 359/689 |
| 5,157,552 | * 10/1992 | Hagimori | 359/690 |
| 5,257,134 | * 10/1993 | Sugawara | 359/679 |
| 5,313,330 | 5/1994 | Betensky | 359/676 |
| 5,805,347 | * 9/1998 | Mizutani et al. | 359/663 |

* cited by examiner

Primary Examiner—Jordan M. Schwartz
(74) Attorney, Agent, or Firm—Burns, Doane, Swecker & Mathis, LLP

(57) ABSTRACT

A zoom lens system for focusing a finite distance object on an image plane as an image, has, in order from one conjugate side, a first lens unit having a positive optical power, the first lens unit being stationary during a zooming operation, a stop stationary during a zooming operation, a second lens unit having a negative optical power, a third lens unit having a positive optical power, and a fourth lens unit having a positive optical power. The zooming operation is performed by varying distances between the first through fourth lens units, and the first and second lens units form an afocal condition.

9 Claims, 5 Drawing Sheets

Fig. 4(a) — eff. FNO=7.00 (T), Spherical Aberration / Sine Condition, -0.2 to 0.2, d, SC Fig. 4(b) — Y'=9.9, Astigmatism, -0.2 to 0.2, DM, DS Fig. 4(c) — Y'=9.9, Distortion %, -2.0 to 2.0

Fig. 4(d) — eff. FNO=7.00 (M), Spherical Aberration / Sine Condition, -0.2 to 0.2, d, SC Fig. 4(e) — Y'=10.8, Astigmatism, -0.2 to 0.2, DM, DS Fig. 4(f) — Y'=10.8, Distortion %, -2.0 to 2.0

Fig. 4(g) — eff. FNO=7.00 (W), Spherical Aberration / Sine Condition, -0.2 to 0.2, d, SC Fig. 4(h) — Y'=14.3, Astigmatism, -0.2 to 0.2, DM, DS Fig. 4(i) — Y'=14.3, Distortion %, -2.0 to 2.0

ZOOM LENS SYSTEM

CROSS-REFERENCE TO RELATED APPLICATIONS

This application is based on Patent Application No. 11-153569 filed in Japan, the content of which is hereby incorporated by reference.

BACKGROUND OF THE INVENTION

1. Field of the Invention

The present invention relates to a zoom lens system, for embodiment, a zoom lens system suited for use as an image reading optical system used in a reading devices such as document copiers and film scanners.

2. Description of the Related Art

When reading a finite distance object, Koeler illumination is often used to uniformly illuminate the object surface. In order to maintain illumination uniformity when Koeler illumination is used, the image forming position of the Koeler illumination system and the entrance pupil position of the finite distance system must be at virtually the same position. Such an optical arrangement is not very complex when the finite distance system is a simple focal lens.

When a zoom lens system is the finite distance system, it is difficult to ensure illumination uniformity when conventional Koeler illumination is used since the entrance pupil position moves during zooming operation. If a well-known front stop zoom lens system is used as a finite distance system, illumination uniformity can be ensured by maintaining a constant entrance pupil position during zooming operation. However, distortion and lateral chromatic aberration correction is difficult because the system has a positive optical power behind the stop in a front stop zoom lens system. Moreover, if these corrections are made during zooming operation, the increase in the zooming ratio becomes complicated, and the zoom lens system is greatly enlarged.

SUMMARY OF THE INVENTION

An object of the present invention is to provide an improved zoom lens system.

A further object of the present invention is to provide a zoom lens system which maintains a constant entrance pupil position during zooming.

A still further object of the present invention is to provide a compact, high zoom ratio zoom lens system which provides excellent correction of various aberrations such as distortion and lateral chromatic aberration.

These object is attained by a zoom lens system for focusing a finite distance object on an image plane as an image, comprising, in order from one conjugate side, a first lens unit having a positive optical power, the first lens unit being stationary during a zooming operation, a stop stationary during a zooming operation, a second lens unit having a negative optical power, a third lens unit having a positive optical power, and a fourth lens unit having a positive optical power, wherein the zooming operation is performed by varying distances between the first through fourth lens units, wherein an approximate afocal condition exists between the first lens unit and the second lens unit.

BRIEF DESCRIPTION OF THE DRAWINGS

These and other objects and features of this invention will become clear from the following description, taken in conjunction with the preferred embodiments with reference to the accompanied drawings in which:

FIG. 4 is an aberration diagram of a first embodiment;

DETAILED DESCRIPTION OF THE PREFERRED EMBODIMENTS

Figure 1:
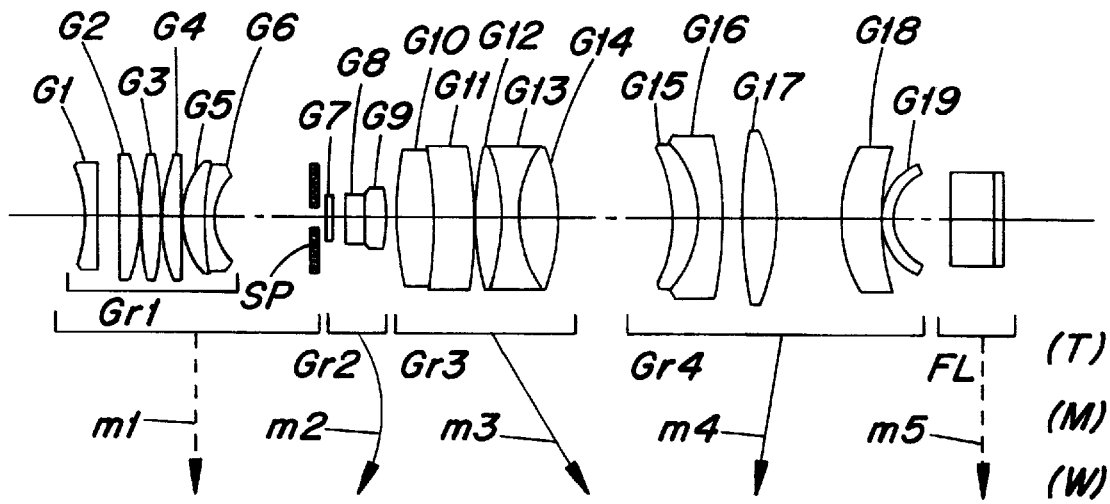
FIG. 1 is a lens structure diagram of a first embodiment.
Figure 2:
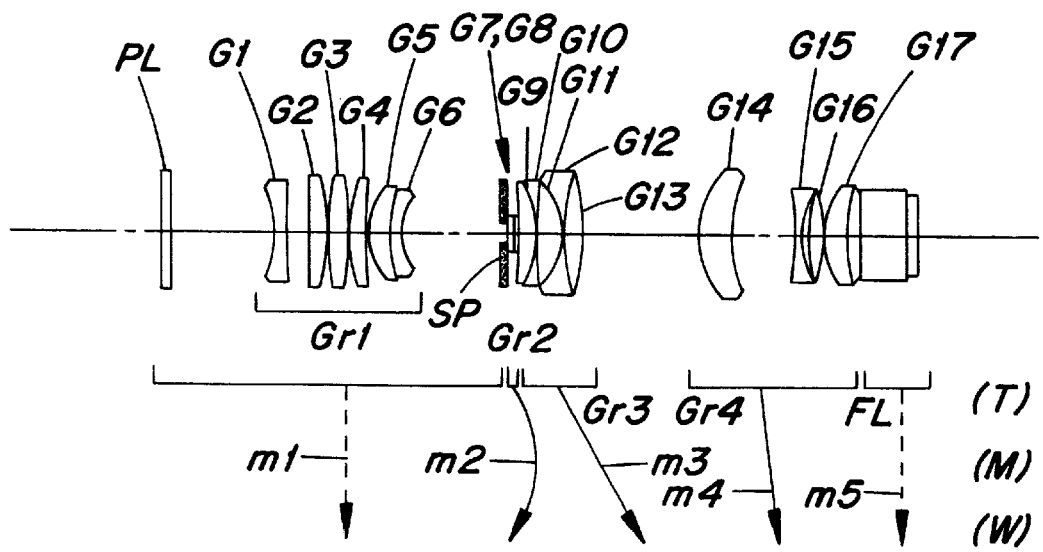
FIG. 2 is a lens structure diagram of a second embodiment.
Figure 3:
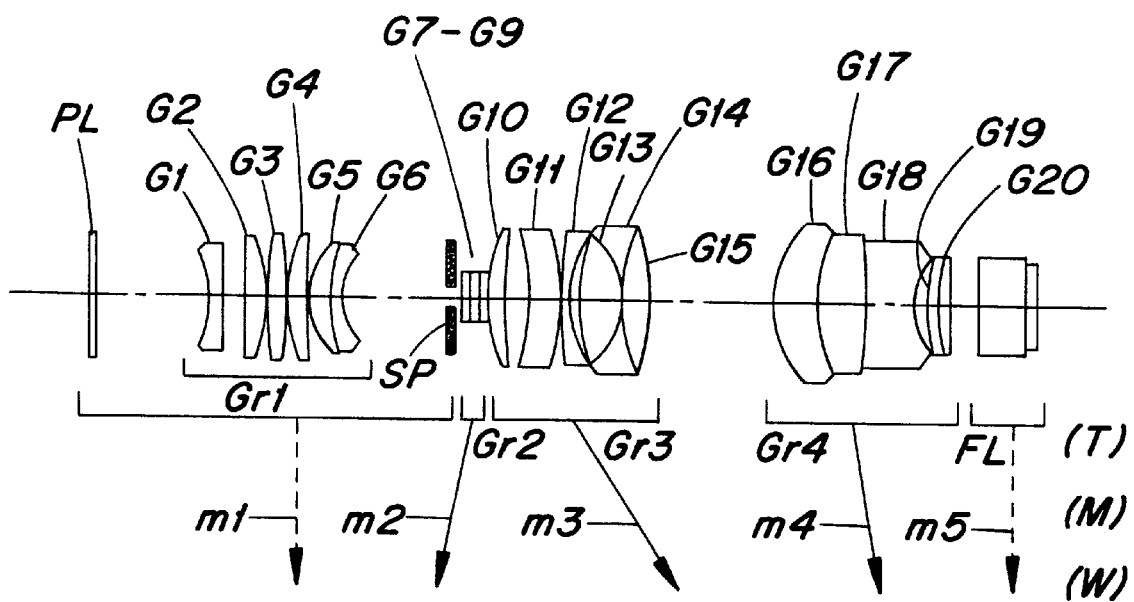
FIG. 3 is a lens structure diagram of a third embodiment.

The embodiments of the finite distance zoom lens system of the present invention are described hereinafter with reference to the accompanying drawings. FIGS. 1~3 are lens structure diagrams respectively corresponding to the zoom lens systems of the first through third embodiments, and illustrate the lens layout from the telephoto end (T). The arrow mj (j=1, 2, 3, 4, 5) in each lens structure diagram schematically indicates the movement of each lens unit when zooming from the telephoto end (T) to the wide angle end (W), and the dashed arrows m1 and m5 represent fixed positions during zooming operation. Lens element marked Gi (i=1, 2, 3, ... ) are the number i lens counting from the object side.

The first through third embodiments are zoom lenses of four unit construction comprising. sequentially from the object side, a first lens unit (Gr1) of positive optical power, a stop (SP), a second lens unit (Gr2) of negative optical power, a third lens unit (Gr3) of positive optical power, and a fourth lens unit (Gr4) of positive optical power, wherein zooming is accomplished by changing the spacing between the various lens units. In the second and third embodiments, a protective glass (PL) is provided at a stationary position during zooming on the outermost object side, and in the first through third embodiments, a filter (FL) is disposed at a fixed position during zooming on the outermost image side.

In the first embodiment (FIG. 1), the lens units (Gr1~Gr4) are constructed, sequentially from the object side, as described below. The first lens unit (Gr1) comprises a biconcave lens (G1), positive meniscus lens (G2) which is convex on the image side, biconvex lens (G3), positive meniscus lens (G4) which is convex on the object side, and a cemented lens formed of a positive meniscus lens (G5) which is convex on the object side and a negative meniscus lens (G6) which is concave on the image side. The second lens unit (Gr2) comprises two biconcave lenses (G7, G8), and a biconvex lens (G9). The third lens unit (Gr3) comprises a cemented lens formed of a biconvex lens (G10) and a negative meniscus lens (G11) which is concave on the object side, a biconvex lens (G12), biconcave lens (G13), and biconvex lens (G14). The fourth lens unit (Gr4) comprises a cemented lens formed of a positive meniscus lens (G15) which is convex on the image side and a negative meniscus lens (G16) which is concave on the object side, a biconvex lens (G17), a positive meniscus lens (G18) which is convex on the object side, and a negative meniscus lens (G19) which is concave on the image side.

In the second embodiment (FIG. 2), the lens units (Gr1~Gr4) are constructed, sequentially from the object side, as described below. The first lens unit (Gr1) comprises a biconcave lens (G1), positive meniscus lens (G2) which is convex on the image side, biconvex lens (G3), positive meniscus lens (G4) which is convex on the object side, and a cemented lens formed of a positive meniscus lens (G5) which is convex on the object side and a negative meniscus lens (G6) which is concave on the image side. The second lens unit (Gr2) comprises a biconcave lens (G7), and a positive meniscus lens (G8) which is convex on the object side. The third lens unit (Gr3) comprises a positive meniscus lens (G9) which is convex on the image side, a negative meniscus lens (G10) which is concave on the object side, a biconvex lens (G11), biconcave lens (G12), and biconvex lens (G13). The fourth lens unit (Gr4) comprises a positive meniscus lens (G14) which is convex on the object side, a biconcave lens (G16), biconvex lens (G16), and a positive meniscus lens (G17) which is convex on the object side.

In the third embodiment (FIG. 3), the lens units (Gr1~Gr4) are constructed, sequentially from the object side, as described below. The first lens unit (Gr1) comprises a biconcave lens (G1), positive meniscus lens (G2) which is convex on the image side, biconvex lens (G3), positive meniscus lens (G4) which is convex on the object side, and a cemented lens formed of a positive meniscus lens (G5) which is convex on the object side and a negative meniscus lens (G6) which is concave on the image side. The second lens unit (Gr2) comprises a biconcave lens (G7), negative meniscus lens (G8) which is concave on the object side, and a biconvex lens (G9). The third lens unit (Gr3) comprises a positive meniscus lens (G10) which is convex on the object side, a positive meniscus lens (G11) which is convex on the image side, a negative meniscus lens (G12) which is concave on the image side, a cemented lens formed of a biconvex lens (G13) and a biconcave lens (G14), and a biconvex lens (G15). The fourth lens unit (Gr4) comprises a positive meniscus lens (G15 which is convex on the object side, a biconvex lens (G17), a biconcave lens (G18), a positive meniscus lens (G19) which is convex on the object side, and a biconvex lens (G20).

Each lens unit (Gr1~Gr4) in the first through third embodiments perform the zoom movement described below when zooming from the wide angle end (minimum magnification state) (W) to the telephoto end (maximum magnification state) (T). In the first embodiment (FIG. 1), the first lens unit (Gr1) and the stop (SP) are fixed, and the second lens unit (Gr2) moves to an intermediate magnification state (M) on the image side, and thereafter moves to the object side. Then, the third lens unit (Gr3) moves to the object side, and the fourth lens unit (Gr4) moves to the image side. In the second embodiment (FIG. 2), the first lens unit (Gr1) and the stop (SP) are fixed, and the second lens unit (Gr2) moves to an intermediate magnification state (M) on the image side, and thereafter moves to the object side. Then, the third lens unit (Gr3) moves to the object side, and the fourth lens unit (Gr4) moves to the object side. In the third embodiment (FIG. 3), the first lens unit (Gr1) and the stop (SP) are fixed, and the second lens unit (Gr2) moves to the image side. Then, the third lens unit (Gr3) moves to the object side, and the fourth lens unit (Gr4) moves to the object side.

As previously described, in order to ensure illumination uniformity using Koeler illumination, the image forming position of the Koeler illumination system and the entrance pupil position of the finite distance system must be nearly identical. The zoom lens entrance pupil position must be held stationary during zooming to realize this arrangement in a finite distance system. For this reason, the position of the stop and all optical elements on the object side of the stop must be fixed during zooming. In the previously described embodiments, the first lens unit (Gr1) and the stop (SP) are fixed during zooming to maintain a constant entrance pupil position during zooming. Accordingly, in all of the embodiments illumination uniformity can be ensured when Koeler illumination is used. Distortion and lateral chromatic aberration can be readily corrected when the first lens unit (Gr1) positioned on the object side of the stop (SP) has positive optical power. When aberration correction is accomplished by a positive-negative-positive-positive four lens unit zoom construction, high optical performance is ensured while attaining a high zoom ratio and compactness.

An approximate afocal condition exists between the first lens unit (Gr1) and second lens unit (Gr2) in all embodiments. That is, construction is such that the object position is near the front focal point of the first lens unit (Gr1). Since an afocal condition exists between the first lens unit (Gr1) ands the second lens unit (Gr2), off-axial performance can be readily changed while maintaining axial performance by changing the spacing between the first lens unit (gr1) and the second lens unit (Gr2). Accordingly, various aberrations such as image plane curvature, astigmatism and the like can be easily corrected. Since an afocal condition exists between the first lens unit (Gr1) ands the second lens unit (Gr2) the light flux can be split and the optical path bent without changing the brightness of the optical system by inserting a mirror or prism between the first lens unit (Gr1) and second lens unit (Gr2). Accordingly, the overall zoom lens can have a compact structure by bending the optical path.

In a zoom lens having the previously described characteristics, it is desirable that the first lens unit (Gr1) satisfies condition (1) below.

$$0.05 < f1/f\beta W < 0.8 \tag{1}$$

Where f1 represents the focal length of the first lens unit (Gr1), and fβW represents the focal length of the total system in the minimum magnification state (W).

Condition (1) stipulates the focal length of the first lens unit (Gr1). When the lower limit of condition (1) is exceeded, the optical power of the first lens unit (Gr1) becomes excessively strong, and although beneficial in respect to compactness, correction of spherical aberration becomes difficult. When the upper limit of condition (1) is exceeded, the optical power of the first lens unit (Gr1) becomes excessively weak, compactness is lost and distortion and lateral chromatic aberration are difficult to correct.

It is further desirable that the second lens unit (Gr2) and the third lens unit (Gr3) satisfy condition (2) below.

$$-2.0 < f2/f3 < -0.5 \tag{2}$$

Where f2 represents the focal length of the second lens unit (Gr2), and f3 represents the focal length of the third lens unit (Gr3).

Condition (2) stipulates the focal range ratio of the second lens unit (Gr2) and the third lens unit (Gr3). Since the third lens unit (Gr3) carries most of the load for variable magnification, when the upper limit of condition (2) is exceeded, the relative optical power of the third lens unit (Gr3) is weakened relative to the second lens unit (Gr2), the amount of movement required for zooming is increased, and compactness is lost. When the lower limit of condition (2) is exceeded, the relative optical power of the second lens unit (Gr2) is excessively weakened relative to the third lens unit (Gr3), and distortion and lateral chromatic aberration correction becomes difficult.

In order to form an afocal condition between the first lens unit (Gr1) and the second lens unit (Gr2) to provide excellent correction of lateral chromatic aberration and distortion of the entire system, the first lens unit (Gr1) desirably comprises sequentially from the object side a negative lens element having a strongly concave surface on the object side, a positive lens element of three or more elements, and a cemented lens element formed by a positive meniscus lens having a convex surface facing the object side and a negative meniscus lens having a strongly concave surface on the image side. In this construction, the concave surface of the negative lens is effective in achieving compactness in the diameter direction, and the convex surface of the positive lens is effective for aberration correction within the first lens unit (Gr1) (via the positive action of the convex surface). The cemented lens is effective for chromatic aberration correction, and dividing the positive lens into three or more elements is effective for suppressing the generation of strong aberration as well as avoiding enlargement in the optical axis direction.

In the construction data of each embodiment, ri (i=1, 2, 3, . . . ) represents the radius of curvature of the number i surface counting from the object side, di (i=1, 2, 3, . . . ) represents the number i axial distance counting from the object side, Ni (i=1, 2, 3, . . . ) and vi (i=1, 2, 3 . . . ) respectively represent the refractive index (Nd) and the Abbe number (vd) on the d-line of the number i optical element counting from the object side. In the construction data, the axial distance (variable distance) changing during zooming is the empty space of the telephoto end (T) to the intermediate magnification state (M) to the wide angle end (W). The object distance (the distance from the object to the first surface (r1)) OD is expressed together with the total system magnification $\beta$ and effective F number (FNO) at each state (T), (M), (W), and the corresponding values of conditions (1) and (2) in each embodiment are shown in Table.

Embodiment 1
OD = 31.04, $\beta$ = −0.84~−0.61~−0.52, Effective FNO = 7.0

| [Radius of Curvature] | [Axial Distance] | [Refractive Index] | [Abbe Number] |
|---|---|---|---|
| First lens unit(Gr1) . . . | | | |
| r1 = −49.574 | d1 = 4.000 | N1 = 1.61659 | v1 = 36.66 . . . G1 |
| r2 = 853.898 | d2 = 10.000 | | |
| r3 = −657.670 | d3 = 8.000 | N2 = 1.61800 | v2 = 63.39 . . . G2 |
| r4 = −83.759 | d4 = 1.000 | | |
| r5 = 186.000 | d5 = 8.000 | N3 = 1.61800 | v3 = 63.39 . . . G3 |
| r6 = −186.000 | d6 = 0.600 | | |
| r7 = 70.475 | d7 = 7.000 | N4 = 1.61800 | v4 = 63.39 . . . G4 |
| r8 = 310.030 | d8 = 2.600 | | |
| r9 = 36.463 | d9 = 8.000 | N5 = 1.69100 | v5 = 54.75 . . . G5 |
| r10 = 77.721 | d10 = 4.000 | N6 = 1.66446 | v6 = 35.84 . . . G6 |
| r11 = 26.289 | d11 = 45.000 | | |
| stop(SP) . . . | | | |
| r12 = ∞ | d12 = 4.65~8.354~4.684 | | |
| Second lens unit(Gr2) . . . | | | |
| r13 = −94.442 | d13 = 1.000 | N7 = 1.80741 | v7 = 31.59 . . . G7 |
| r14 = 76.937 | d14 = 7.020 | | |
| r15 = −139.494 | d15 = 8.330 | N8 = 1.70055 | v8 = 27.58 . . . G8 |
| r16 = 299.357 | d16 = 0.110 | | |
| r17 = 130.298 | d17 = 9.150 | N9 = 1.83350 | v9 = 21.00 . . . G9 |
| r18 = −113.590 | d18 = 4.242~32.472~48.753 | | |
| Third lens unit(Gr3) . . . | | | |
| r19 = 130.539 | d19 = 16.010 | N10 = 1.75000 | v10 = 25.14 . . . G10 |
| r20 = −135.309 | d20 = 18.000 | N11 = 1.69100 | v11 = 54.75 . . . G11 |
| r21 = −172.364 | d21 = 0.100 | | |
| r22 = 117.555 | d22 = 11.870 | N12 = 1.49310 | v12 = 83.58 . . . G12 |
| r23 = −70.201 | d23 = 0.100 | | |
| r24 = −69.809 | d24 = 7.000 | N13 = 1.75690 | v13 = 29.69 . . . G13 |
| r25 = 53.253 | d25 = 0.100 | | |
| r26 = 53.553 | d26 = 17.000 | N14 = 1.49310 | v14 = 83.58 . . . G14 |
| r27 = −75.336 | d27 = 51.527~19.582~6.071 | | |
| Fourth lens unit(Gr4) . . . | | | |
| r28 = −57.048 | d28 = 9.310 | N15 = 1.83350 | v15 = 21.00 . . . G15 |
| r29 = −43.906 | d29 = 10.000 | N16 = 1.73300 | v16 = 28.24 . . . G16 |
| r30 = −159.770 | d30 = 8.950 | | |
| r31 = 247.022 | d31 = 15.000 | N17 = 1.48749 | v17 = 70.44 . . . G17 |
| r32 = −82.000 | d32 = 26.630 | | |
| r33 = 60.219 | d33 = 17.690 | N18 = 1.85000 | v18 = 40.04 . . . G18 |
| r34 = 107.964 | d34 = 0.100 | | |
| r35 = 29.787 | d35 = 3.750 | N19 = 1.83350 | v19 = 21.00 . . . G19 |
| r36 = 22.799 | d36 = 24.959~24.980~25.879 | | |
| Filter (FL) . . . | | | |
| r37 = ∞ | d37 = 20.000 | N20 = 1.74400 | v20 = 44.93 |
| r38 = ∞ | d38 = 2.400 | N21 = 1.52310 | v21 = 50.95 |
| r39 = ∞ | | | |

Embodiment 2
OD = 31.04, β = −0.86~−0.63~−0.54, Effective FNO = 7.0

| [Radius of Curvature] | [Axial Distance] | [Refractive Index] | [Abbe Number] |
|---|---|---|---|

Glass (PL) . . .

| r1 = ∞ | d1 = 2.500 | N1 = 1.52310 | ν1 = 50.95 |
| r2 = ∞ | d2 = 46.780 | | |

First lens unit (Gr1) . . .

| r3 = −49.574 | d3 = 4.000 | N2 = 1.61659 | ν2 = 36.66 . . . G1 |
| r4 = 853.898 | d4 = 10.000 | | |
| r5 = −657.670 | d5 = 8.000 | N3 = 1.61800 | ν3 = 63.39 . . . G2 |
| r6 = −83.759 | d6 = 1.000 | | |
| r7 = 186.000 | d7 = 8.000 | N4 = 1.61800 | ν4 = 63.39 . . . G3 |
| r8 = −186.000 | d8 = 0.600 | | |
| r9 = 70.475 | d9 = 7.000 | N5 = 1.61800 | ν5 = 63.39 . . . G4 |
| r10 = 310.030 | d10 = 2.600 | | |
| r11 = 36.463 | d11 = 8.000 | N6 = 1.69100 | ν6 = 54.75 . . . G5 |
| r12 = 77.721 | d12 = 4.000 | N7 = 1.66446 | ν7 = 35.84 . . . G6 |
| r13 = 26.289 | d13 = 45.000 | | |

Stop(SP) . . .

| r14 = ∞ | d14 = 2.000~6.083~2.000 | | |

Second lens unit(Gr2) . . .

| r15 = −266.013 | d15 = 1.000 | N8 = 1.67339 | ν8 = 29.25 . . . G7 |
| r16 = 38.140 | d16 = 1.190 | | |
| r17 = 41.241 | d17 = 1.400 | N9 = 1.83350 | ν9 = 21.00 . . . G8 |
| r18 = 125.271 | d18 = 1.200~32.615~52.221 | | |

Third lens unit(Gr3) . . .

| r19 = −294.514 | d19 = 5.360 | N10 = 1.75450 | ν10 = 51.57 . . . G9 |
| r20 = −52.468 | d20 = 0.100 | | |
| r21 = −57.881 | d21 = 2.000 | N11 = 1.67339 | ν11 = 29.25 . . . G10 |
| r22 = −287.308 | d22 = 0.100 | | |
| r23 = 207.293 | d23 = 10.960 | N12 = 1.49310 | ν12 = 83.58 . . . G11 |
| r24 = −35.374 | d24 = 0.100 | | |
| r25 = −35.341 | d25 = 1.000 | N13 = 1.74000 | ν13 = 31.72 . . . G12 |
| r26 = 105.541 | d26 = 0.100 | | |
| r27 = 101.649 | d27 = 9.380 | N14 = 1.75000 | ν14 = 25.14 . . . G13 |
| r28 = −68.984 | d28 = 48.268~15.130~0.100 | | |

Fouth lens unit(Gr4) . . .

| r29 = 41.095 | d29 = 13.320 | N15 = 1.74250 | ν15 = 52.47 . . . G14 |
| r30 = 61.318 | d30 = 28.030 | | |
| r31 = −122.336 | d31 = 2.000 | N16 = 1.70055 | ν16 = 27.58 . . . G15 |
| r32 = 34.795 | d32 = 3.720 | | |
| r33 = 92.393 | d33 = 6.170 | N17 = 1.49310 | ν17 = 83.58 . . . G16 |
| r34 = −61.576 | d34 = 0.100 | | |
| r35 = 40.753 | d35 = 9.990 | N18 = 1.85000 | ν18 = 40.04 . . . G17 |
| r36 = 94.229 | d36 = 4.874~2.514~2.021 | | |

Filter(FL) . . .

| r37 = ∞ | d37 = 20.000 | N19 = 1.74400 | ν19 = 44.93 |
| r38 = ∞ | d38 = 2.400 | N20 = 1.52310 | ν20 = 50.95 |
| r39 = ∞ | d39 = 0.500 | | |
| r40 = ∞ | d40 = 0.800 | N21 = 1.51680 | ν21 = 64.20 |
| r41 = ∞ | | | |

Glass (PL) . . .

| r1 = ∞ | d1 = 2.500 | N1 = 1.52310 | ν1 = 50.95 |
| r2 = ∞ | d2 = 46.780 | | |

First lens unit(Gr1) . . .

| r3 = −49.574 | d3 = 4.000 | N2 = 1.61659 | ν2 = 36.66 . . . G1 |
| r4 = 853.898 | d4 = 10.000 | | |
| r5 = −657.670 | d5 = 8.000 | N3 = 1.61800 | ν3 = 63.39 . . . G2 |
| r6 = −83.759 | d6 = 1.000 | | |
| r7 = 186.000 | d7 = 8.000 | N4 = 1.61800 | ν4 = 63.39 . . . G3 |
| r8 = −186.000 | d8 = 0.600 | | |
| r9 = 70.475 | d9 = 7.000 | N5 = 1.61800 | ν5 = 63.39 . . . G4 |
| r10 = 310.030 | d10 = 2.600 | | |
| r11 = 36.463 | d11 = 8.000 | N6 = 1.69100 | ν6 = 54.75 . . . G5 |
| r12 = 77.721 | d12 = 4.000 | N7 = 1.66446 | ν7 = 35.84 . . . G6 |
| r13 = 26.289 | d13 = 45.000 | | |

Stop(SP) . . .

| r14 = ∞ | d14 = 5.00~3.961~2.000 | | |

Second lens unit(Gr2) . . .

-continued

Embodiment 2
OD = 31.04, β = −0.86~−0.63~−0.54, Effective FNO = 7.0

| [Radius of Curvature] | [Axial Distance] | [Refractive Index] | [Abbe Number] | |
|---|---|---|---|---|
| r15 = −140.995 | d15 = 1.000 | N8 = 1.75000 | v8 = 25.14 | ... G7 |
| r16 = 53.924 | d16 = 0.840 | | | |
| r17 = −64.670 | d17 = 4.980 | N9 = 1.59270 | v9 = 35.45 | ... G8 |
| r18 = −176.581 | d18 = 0.100 | | | |
| r19 = 95.310 | d19 = 1.650 | N10 = 1.83350 | v10 = 21.00 | ... G9 |
| r20 = −111.422 | d20 = 1.200~43.354~65.927 | | | |
| Third lens unit(Gr3) ... | | | | |
| r21 = 64.450 | d21 = 6.960 | N11 = 1.85000 | v11 = 40.04 | ... G10 |
| r22 = 265.592 | d22 = 9.940 | | | |
| r23 = −103.838 | d23 = 13.830 | N12 = 1.48749 | v12 = 70.44 | ... G11 |
| r24 = −83.461 | d24 = 0.180 | | | |
| r25 = 281.508 | d25 = 3.410 | N13 = 1.80518 | v13 = 25.43 | ... G12 |
| r26 = 50.971 | d26 = 2.390 | | | |
| r27 = 71.811 | d27 = 17.970 | N14 = 1.49310 | v14 = 83.58 | ... G13 |
| r28 = −38.068 | d28 = 1.000 | N15 = 1.74000 | v15 = 31.72 | ... G14 |
| r29 = 83.388 | d29 = 0.450 | | | |
| r30 = 88.761 | d30 = 11.140 | N16 = 1.79850 | v16 = 22.60 | ... G15 |
| r31 = −101.582 | d31 = 51.721~19.810~1.500 | | | |
| Fourth(Gr4) ... | | | | |
| r32 = 53.855 | d32 = 16.167 | N17 = 1.76200 | v17 = 40.36 | ... G16 |
| r33 = 65.763 | d33 = 0.540 | | | |
| r34 = 62.394 | d34 = 20.000 | N18 = 1.83400 | v18 = 37.05 | ... G17 |
| r35 = −265.172 | d35 = 0.450 | | | |
| r36 = −201.406 | d36 = 19.420 | N19 = 1.84666 | v19 = 23.82 | ... G18 |
| r37 = 30.495 | d37 = 5.640 | | | |
| r38 = 58.356 | d38 = 3.740 | N20 = 1.49310 | v20 = 83.58 | ... G19 |
| r39 = 606.288 | d39 = 0.450 | | | |
| r40 = 111.253 | d40 = 4.880 | N21 = 1.85026 | v21 = 32.15 | ... G20 |
| r41 = −328.048 | d41 = 11.605~2.402~0.100 | | | |
| Filter(FL) ... | | | | |
| r42 = ∞ | d42 = 20.000 | N22 = 1.74400 | v22 = 44.93 | |
| r43 = ∞ | d43 = 2.400 | N23 = 1.52310 | v23 = 50.95 | |
| r44 = ∞ | d44 = 0.500 | | | |
| r45 = ∞ | d45 = 0.800 | N24 = 1.51680 | v24 = 64.20 | |
| r46 = ∞ | | | | |

TABLE

| | CONDITION (1) f1/fβW | CONDITION (2) f2/f3 |
|---|---|---|
| Emb. 1 | 0.36 | −1.14 |
| Emb. 2 | 0.44 | −1.46 |
| Emb. 3 | 0.22 | −1.06 |

Figures 5A, 5B, 5C:
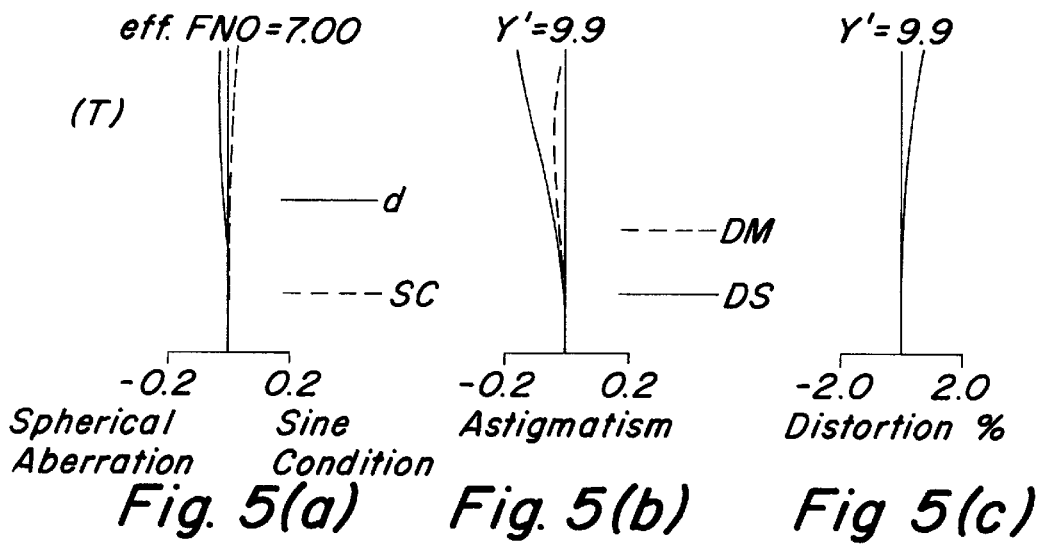
FIG. 5 is an aberration diagram of a second embodiment.
Figures 5D, 5E, 5F:
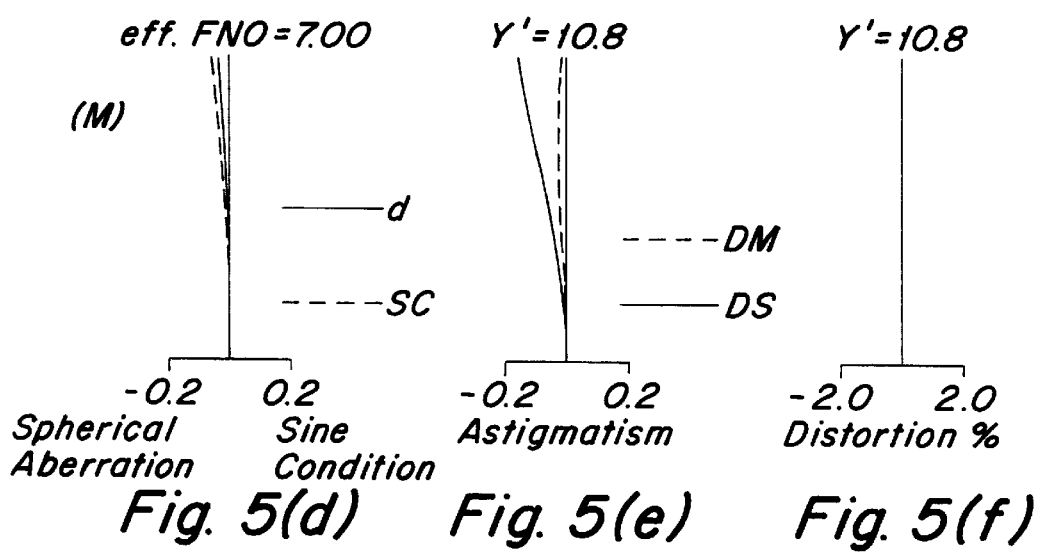
Figures 5G, 5H, 5I:
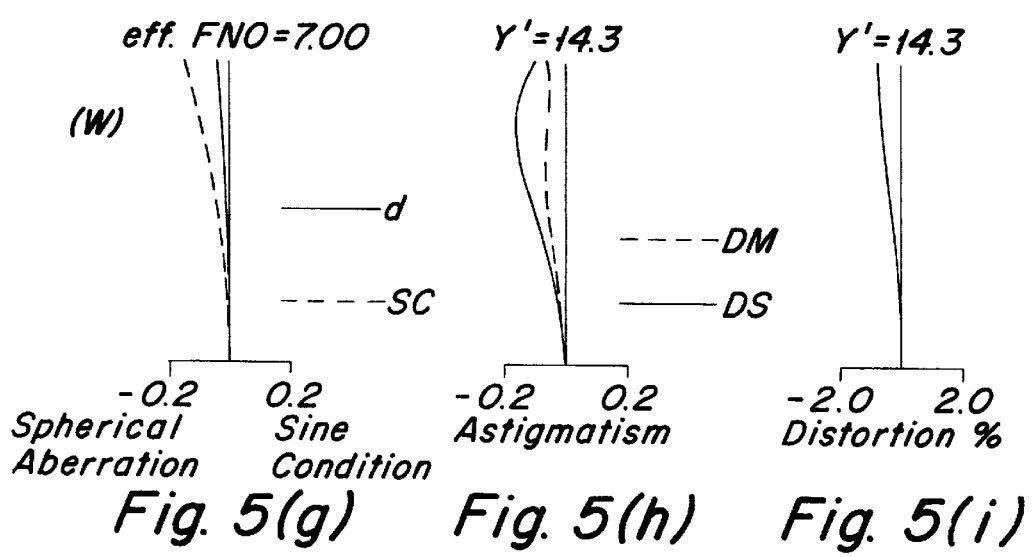
Figures 6A, 6B, 6C:
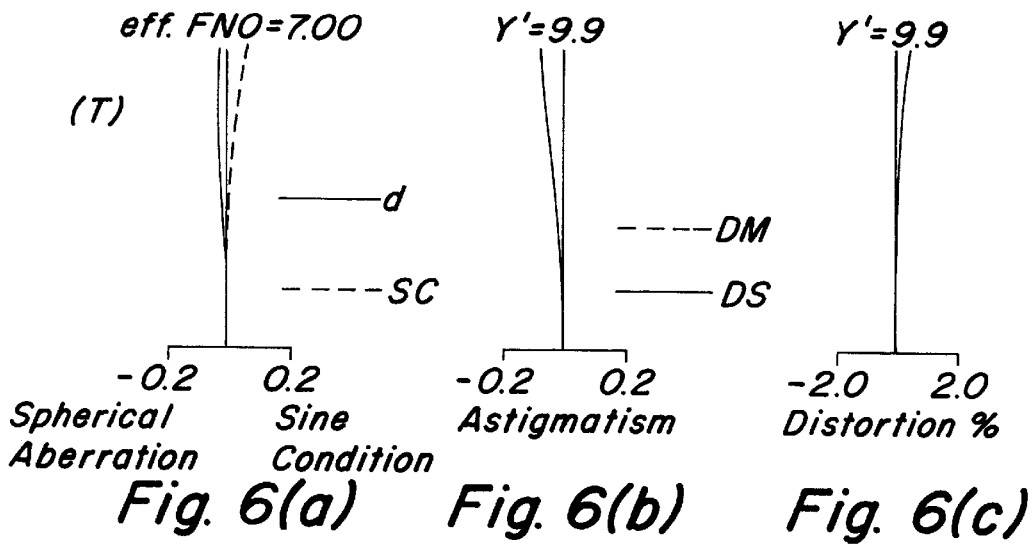
FIG. 6 is an aberration diagram of a third embodiment.
Figures 6D, 6E, 6F:
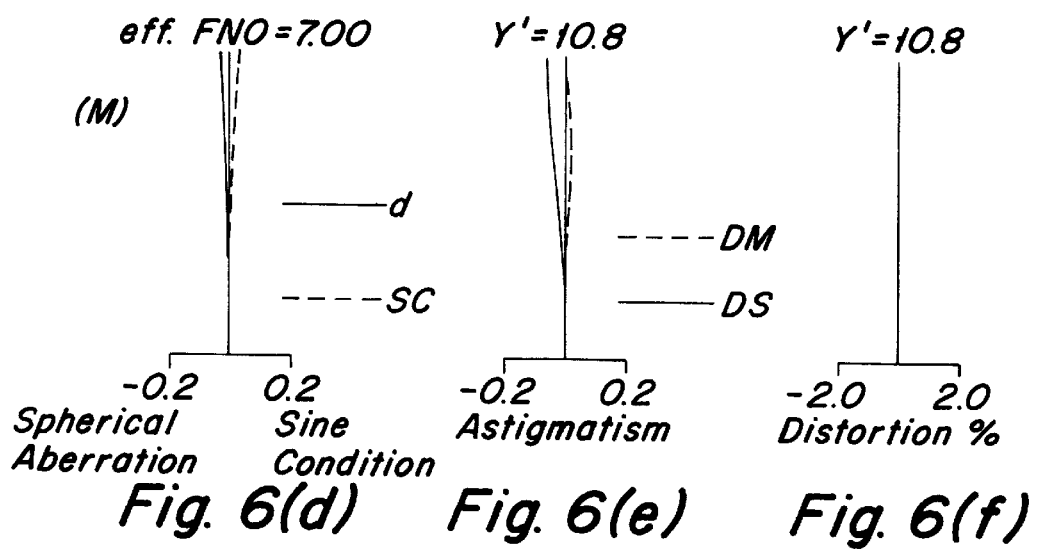
Figures 6G, 6H, 6I:
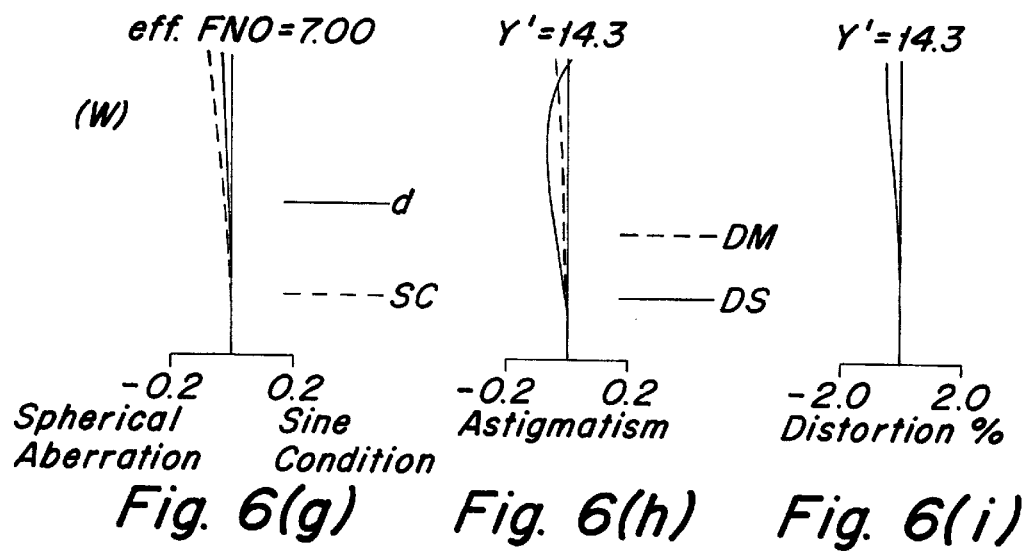

FIGS. 4~6 are aberration diagrams corresponding to embodiments 1~3, and show various aberrations (sequentially from the left: spherical aberration (a), (d) and (g), astigmatism (b), (e) and (h), distortion (c), (e) and (i)) relative to a finite distance object at the telephoto end (T), intermediate magnification state (M), and wide angle end (W). In the spherical aberration diagrams, the solid line (d) represents the spherical aberration on the d-line, and the dashed line (SC) represents the sine condition. In the astigmatism diagrams, the dashed line (DM) and the solid line (DS) respectively represent astigmatism on the meridional plane and sagittal plane.

According to the zoom lens systems of the previously described embodiments, since the first lens unit and the stop are fixed during zooming operation, the entrance pupil position is held constant during zooming, such that illumination uniformity can be ensured when using Koeler illumination.

According to the aforesaid embodiments, excellent correction of distortion and chromatic aberration is obtained because the first lens unit positioned on the object side from the stop has a positive optical power, and a high zoom ratio and compactness are achieved while ensuring high optical performance because the aberration correction is accomplished using a positive-negative-positive-positive type four unit zoom construction.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A zoom lens system for focusing a finite distance object on an image plane as an image, comprising, in order from one conjugate side:

a first lens unit having a positive optical power, the first lens unit being stationary during a zooming operation;

a stop stationary during a zooming operation;

a second lens unit having a negative optical power;

a third lens unit having a positive optical power, and a fourth lens unit having a positive optical power;

wherein the zooming operation is performed by varying distances between the first through fourth lens units, wherein the first and second lens units form an afocal condition.

2. The zoom lens system as claimed in claim 1, wherein the following condition is fulfilled:

$$0.05 < f1/f\beta W < 0.8$$

where f1 represents the focal length of the first lens unit, and fβW represents the focal length of the total system in the minimum magnification state.

3. The zoom lens system as claimed in claim 1, wherein the following condition is fulfilled:

$$-2.0 < f2/f3 < -0.5$$

where f2 represents the focal length of the second lens unit, and f3 represents the focal length of the third lens unit.

4. A zoom lens system for focusing a finite distance object on an image plane as an image, comprising, in order from one conjugate side:

a first lens unit having a positive optical power, the first lens unit being stationary during a zooming operation;

a stop stationary during a zooming operation;

a second lens unit having a negative optical power;

a third lens unit having a positive optical power, and a fourth lens unit having a positive optical power;

wherein the zooming operation is performed by varying distances between the first through fourth lens units, wherein the finite distance object is positioned at an object side focal point of the first lens unit.

5. The zoom lens system as claimed in claim 4, wherein the following condition is fulfilled:

$$0.05 < f1/f\beta W < 0.8$$

where f1 represents the focal length of the first lens unit, and fβW represents the focal length of the total system in the minimum magnification state.

6. The zoom lens system as claimed in claim 5, wherein the following condition is fulfilled:

$$-2.0 < f2/f3 < -0.5$$

where f2 represents the focal length of the second lens unit, and f3 represents the focal length of the third lens unit.

7. A zoom lens system for focusing a finite distance object on an image plane as an image, comprising, in order from one conjugate side:

a first lens unit having a positive optical power, the first lens unit being stationary during a zooming operation;

a stop stationary during a zooming operation;

a second lens unit having a negative optical power;

a third lens unit having a positive optical power, and a fourth lens unit having a positive optical power;

wherein the zooming operation is performed by varying distances between the first through fourth lens units, wherein a position of an entrance pupil of the zoom lens system is stationary during the zooming operation.

8. The zoom lens system as claimed in claim 7, wherein the following condition is fulfilled:

$$0.05 < f1/f\beta W < 0.8$$

where f1 represents the focal length of the first lens unit, and fβW represents the focal length of the total system in the minimum magnification state.

9. The zoom lens system as claimed in claim 7, wherein the following condition is fulfilled:

$$-2.0 < f2/f3 < -0.6$$

where f2 represents the focal length of the second lens unit, and f3 represents the focal length of the third lens unit.

* * * * *